(12) United States Patent
Choi et al.

(10) Patent No.: US 8,344,863 B2
(45) Date of Patent: Jan. 1, 2013

(54) APPARATUS AND METHOD FOR PROVIDING HAPTIC AUGMENTED REALITY

(75) Inventors: Seungmoon Choi, Pohang-si (KR); Seokhee Jeon, Daegu (KR)

(73) Assignee: Postech Academy-Industry Foundation, Pohang-Si (KR)

( * ) Notice: Subject to any disclaimer, the term of this patent is extended or adjusted under 35 U.S.C. 154(b) by 981 days.

(21) Appl. No.: 12/394,032

(22) Filed: Feb. 26, 2009

(65) Prior Publication Data

US 2010/0141409 A1   Jun. 10, 2010

(30) Foreign Application Priority Data

Dec. 10, 2008  (KR) .................. 10-2008-0125411
Feb. 13, 2009  (KR) .................. 10-2009-0011851

(51) Int. Cl.
*G08B 6/00* (2006.01)

(52) U.S. Cl. ................. 340/407.2; 340/407.1; 340/3.1; 340/506; 340/665; 340/666

(58) Field of Classification Search .............. 340/407.1, 340/407.2, 3.1, 506, 665, 668
See application file for complete search history.

(56) References Cited

U.S. PATENT DOCUMENTS

| 7,252,644 B2 * | 8/2007 | Dewald et al. ................ 601/5 |
| 7,308,352 B2 * | 12/2007 | Wang et al. .................. 701/70 |
| 7,683,565 B2 * | 3/2010 | Quaid et al. ............ 318/568.16 |
| 2007/0296366 A1 * | 12/2007 | Quaid et al. ............ 318/568.16 |

* cited by examiner

*Primary Examiner* — Daryl Pope

(57) ABSTRACT

The present invention relates to haptic augmented reality, and more specifically, to a method for providing haptic augmented reality that provides mixed results of a real environment and a virtual environment to a user. The present invention provides an apparatus for providing haptic augmented reality comprising a controller that calculates a repulsive force from an object and determines a driving force in consideration of the calculated repulsive force and preset stiffness; and a driver that drives a haptic device with the determined driving force.

16 Claims, 6 Drawing Sheets

APPARATUS AND METHOD FOR PROVIDING HAPTIC AUGMENTED REALITY

BACKGROUND OF THE INVENTION

1. Technical Field

The present invention relates to haptic augmented reality, and more particularly, to a method for providing haptic augmented reality that provides mixed results of a real environment and a virtual environment to a user.

2. Related Art

Imagine that you are holding a pen-shaped tool in your hand and writing something on a table. Would it be possible that you may feel as though you were writing on a smooth piece of paper with a ball-point pen, or on a soft rubber pad with a marker? The tool may also guide your hand to teach the art of East Asian calligraphy, preferably with the feel of using a brush on a piece of traditional East Asian paper. Creating such haptic illusions belongs to the realm of haptic augmented reality.

Augmented Reality (AR), or more generally, Mixed Reality (MR) environment provides the user with sensations resulted from a mix of real and synthetic stimuli that are generated by computer. As conceptualized by Milgram et al., a mixed environment can be located at a reality-virtuality continuum (Milgram, P., Colquhoun Jr., H.: A Taxonomy of Real and Virtual World Display Integration. In: Tamura, Y. (ed.) Mixed Reality. Merging Real and VirtualWorlds, pp. 1.16. Springer, Berlin (1999)) Whether an environment in this continuum is closer to reality or virtuality is determined by the amount of knowledge that the computer is required to manage for the environment. For example, the display with head of a human in an aircraft/automobile cockpit is an application of augmented reality by coating a real photograph of a face image of a celebrity on a virtual body employed in a computer game is classified to be an example of augmented virtuality. Although the continuum was primarily defined for vision, the same continuum can be applied to touch. Given a mixed reality application including both vision and touch, the degrees of reality (or virtuality) for the two sensory modalities can be identified and mapped to the composite visuo-haptic continuum of reality and virtuality.

Earlier research on haptic mixed reality can be categorized using the continuum proposed by Milgram, et al. Although the taxonomy in the continuum is not strictly adhered, even in the literature of visual mixed reality, applying it to haptic mixed reality can be instrumental for elucidating associated concepts. Firstly, "haptic reality" corresponds to applications wherein a user directly touches real objects and feels only a touch from the real object. A typical example is the so-called tangible AR where a real prop held in the hand is used as a tangible interface for visually mixed environments. Secondly, "haptic virtuality" is located at the other end of the continuum, and has received the most attention from the research community. In this case, purely virtual haptic objects are added in a vision mixed reality environment, and the touch of the virtual object is rendered based on the conventional haptic rendering methods under the virtual environment. Thus, accurate positional registration between the haptic and visual coordinate frames is a key issue. The third category is "haptic augmented virtuality". In this environment, a real prop attached to the haptic device to provide the sensation of surface real material and the haptic device performs only a role of a force-feedback device of the virtual object.

SUMMARY OF THE INVENTION

The present invention proposes haptic augmented reality. It is an object of the present invention to provide augmented haptic information by coating virtual tactile information on tactile information generated when a haptic device collides with a real object.

Therefore, a technical problem to be achieved by at least one embodiment of the present invention is to provide an apparatus for providing haptic augmented reality enabling a user, which is integrated with a haptic device colliding with an object, to bodily sense real stiffness and other stiffness of the object.

Another technical problem to be achieved by at least one embodiment of the present invention is to provide a method for providing haptic augmented reality enabling a user, which is integrated with a haptic device colliding with an object, to bodily sense real stiffness and other stiffness of the object.

Another technical problem to be achieved by at least one embodiment of the present invention is to provide a recording medium readable with a computer stored with a computer program enabling a user, which is integrated with a haptic device colliding with an object, to bodily sense real stiffness and other stiffness of the object.

In order to achieve the above technical problems, the present invention provides an apparatus for providing haptic augmented reality comprising a controller that calculates a repulsive force from an object and determines a driving force in consideration of the calculated repulsive force and preset stiffness; and a driver that drives a haptic device with the determined driving force.

Preferably, the controller measures displacement of the object and determines the driving force in consideration of the measured displacement, the calculated repulsive force, and the preset stiffness.

Preferably, the controller senses the collision between the object and the haptic device and generates control signals while the object is deformed due to the collision with the haptic device and the driver is operated in response to the control signals.

Further, the controller checks whether the repulsive force from the object exceeds a threshold to sense the collision between the haptic device and the object.

Meanwhile, according to another embodiment of the present invention, there is provided a method for providing haptic augmented reality comprising: calculating a repulsive force from an object; determining a driving force in consideration of the calculated repulsive force and preset stiffness; and driving a haptic device with the determined driving force.

Preferably, the method for providing haptic augmented reality further comprises measuring displacement of the object and the determining determines the driving force in consideration of the calculated repulsive force, the measured displacement, and the preset stiffness.

Preferably, the method for providing haptic augmented reality further comprises sensing the collision between the object and the haptic device and the calculating, the determining, and the driving are performed while the collision between the object and the haptic device is sensed.

Moreover, the sensing checks whether the repulsive force from the object exceeds a threshold to sense the collision between the haptic device and the object.

On the other hand, according to still another embodiment of the present invention, there is provided a recording medium recordable with a computer stored with computer program that enables the computer to run steps of comprising: calculating a repulsive force from an object; determining a driving force in consideration of the calculated repulsive force and preset stiffness; and driving a haptic device with the determined driving force.

According to the present invention, the user can feel the augmented haptic information by increasing and decreasing the repulsive force to and from the real repulsive force using the haptic device rather than directly feeling the repulsive force generated due to the collision with the real object, when the user feels the repulsive force generated by the interaction with the real object.

DESCRIPTION OF THE PREFERRED EMBODIMENTS

Figure 1:
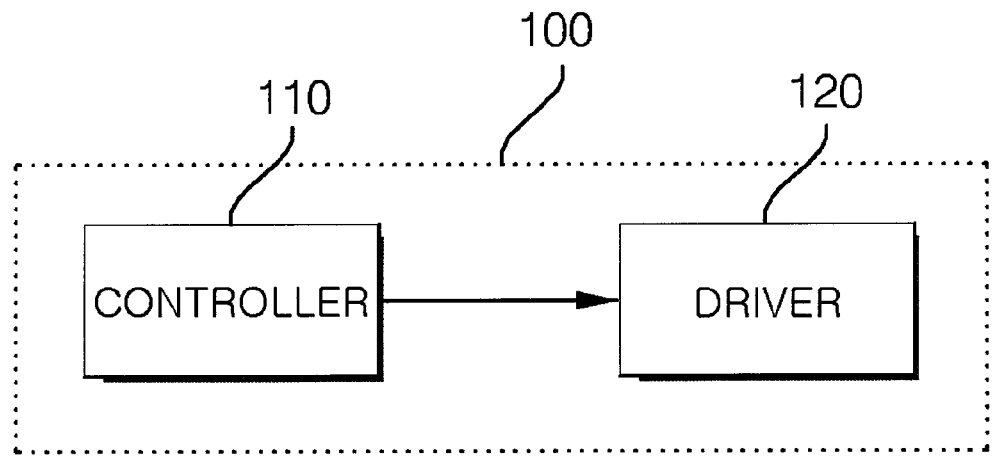
FIG. 1 is a block diagram of an apparatus for providing haptic augmented reality according to at least one embodiment of the present invention.

Hereinafter, exemplary embodiments of the present invention will be described in detail with reference to the accompanying drawings. First of all, it should be noted that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention. Also, although the exemplary embodiments of the present invention are described below, the technical aspects of the present invention are not limited thereto and can be changed and variously practiced by those skilled in the art.

Hereinafter, an apparatus and method for providing haptic augmented reality according to at least one embodiment of the present invention will be described with reference to the accompanying drawings.

FIG. 1 is a block diagram of an apparatus 100 for providing haptic augmented reality according to at least one embodiment of the present invention. The apparatus for providing haptic augmented reality includes a controller 110 and a driver 120. At least one of the controller 110 and the driver 120 can be integrated with a haptic device.

In the specification, the haptic device is a device that includes a plurality of articulations connected to each other in a link structure and if one articulation moves, then other articulations connected to the one articulation can move. The haptic device means a device when at least a part of the plurality of articulations (for example, an articulation positioned at a tip among the plurality of articulations) is integrated with at least a part (for example, fingers) of a user's body so that it can be operated in the user's intention. For example, the user holds the articulation positioned at the tip thereof, making it possible to move the articulation positioned at the tip thereof in the user's intention.

The user moves the haptic device such that the haptic device can collide with the object. At this time, a part colliding with an object among the parts of the haptic device is a tip end of any one articulation of the plurality of articulations that configures the haptic device. In the specification, the colliding end means the tip end. Meanwhile, the "object" may be a virtual object in the specification. However, for convenience of explanation, it is assumed that the object is a real object.

The controller 110 senses whether the 'colliding end of the haptic device' collides with the 'object'. To this end, the controller 110 checks whether the repulsive force from the object exceeds a 'preset threshold' to sense the collision between the colliding end of the haptic device and the object. In other words, if the repulsive force from the object exceeds the threshold, the controller 110 recognizes that the collision between the colliding end and the object is generated.

The controller 110 senses the collision between the object and the colliding end of the haptic device, generates the control signals while the object is deformed due to the collision, and calculates the repulsive force from the object while the collision between the object and the colliding end is sensed.

When the controller 110 calculates the repulsive force, it calculates the repulsive force from the object by using the inertia force of the colliding end and force sensed by the sensor provided between the colliding end of the haptic device and a last link.

If the repulsive force from the object generated by the collision between the colliding end of the haptic device and the object is calculated, the controller 110 controls the driver 120 by determining the driving force that drives the driver 120. Thereby, the driver 120 can transfer the repulsive force augmented by the controller 110, not the repulsive force due to the collision with the real object, to the user.

Figure 2:
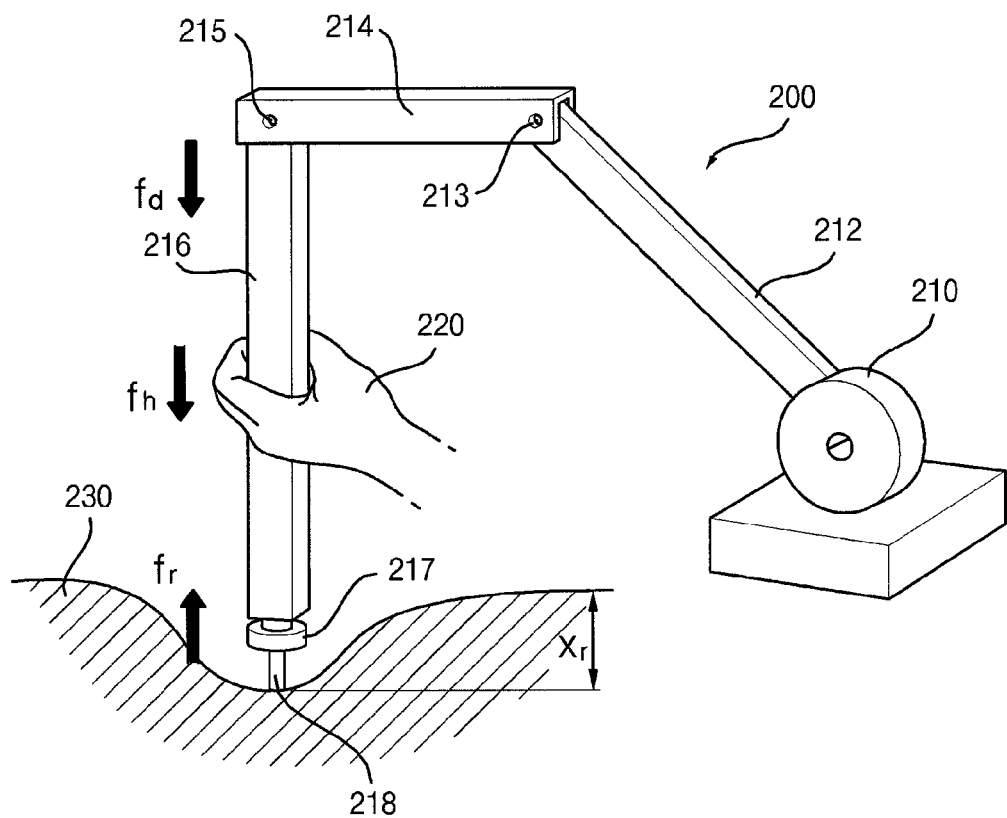
FIG. 2 is a diagram showing one example of a haptic device and explaining a method for calculating a driving force according to one embodiment of the present invention.

FIG. 2 is a diagram showing one example of the haptic device and explaining the method for calculating a driving force according to one embodiment of the present invention.

The apparatus 100 for providing haptic augmented reality according to FIG. 1 may be integrated with a haptic device 200 shown in FIG. 2 as described above.

As shown in FIG. 2, the haptic device 200 includes a plurality of links 212, 214, and 216. The first link 212 and the second link 214 are connected with a first articulation 213 and the second link 214 and the third link 216 are connected with a second articulation 215, in the state where the first link 212 is rotatably connected with a base part 210. As shown in FIG. 1, the driver 120 may be included in a base part of the first link 212 connected with the base part 210 and the first articulation 213 and the second articulation 215. The end of the third link 216 is provided with a force sensor 217 and a colliding end 218 is provided at a lower part of the force sensor 217.

A user 220 holds the third link 216 and moves it so that the colliding end 218 of the haptic device 210 collides with an object 230. This situation is represented by the following equations 1 and 2.

$$f_r(t) = f_s(t) - f_i(t) \quad \text{[Equation 1]}$$

$$f_i(t) = m_r a(t) \quad \text{[Equation 2]}$$

In the above Equations 1 and 2, t means time, $f_r(t)$ means the repulsive force due to the collision with the object 230, $f_s(t)$ means the force sensed by the force sensor 217, $m_r$ means a mass of the colliding end 218, a(t) means acceleration in a direction that presses the (object) of the colliding end 218, and $f_i(t)$ means the inertia force of the colliding end.

The controller 110 can determine that the collision is generated if $f_r(t)$ is larger than a decision threshold for determining the collision.

However, in real implementation, it may be difficult to obtain acceleration a(t) of the colliding end 218. In this case, in order to obtain a(t), it is possible to use a specialized acceleration sensor. In the case of using the acceleration sensor, there is a problem in that it causes the system to be complicated and increases cost. As an easy method, there may be a method to obtain the acceleration from positional information of the colliding end 218 that is provided by the haptic device. However, differential for a discontinuous positional value provides results including noise, such that it is preferable to use a low frequency passing filter for each differential to obtain the acceleration.

The controller 110 controls the driving force of the haptic device 200 with respect to the repulsive force $f_r(t)$ obtained by Equation 1, thereby changing the force that is realistically felt by the user. In other words, the user can feel force augmented by the apparatus 100 for providing haptic augmented reality rather than the real force caused by repulsion.

The relationship between the force and positional displacement is generally called stiffness. In a particular time t, assume that the stiffness of the real object is k(t). If the apparatus 100 for providing haptic augmented reality does not perform the control, this value may be the stiffness felt by the user. Our goal is to change k(t) into our own desired value k*(t) by appropriately using the haptic device 200. Assume that the force generated from the haptic device 200 is $f_d(t)$ and the force generated from the user's hand is $f_h(t)$. The surface of the real object is deformed due to the above two forces, thereby causing the positional displacement by $X_r(t)$. At this time, the force received from the real object is a sum of the two forces. This is represented by the following Equation 3.

$$f_r(t)=k(t)x_r(t)=f_h(t)+f_d(t) \quad \text{[Equation 3]}$$

In Equation 3, the force $f_h(t)$ felt by the user may be represented by the following Equation 4 and the force generated from the haptic device 200 may be represented by the following Equation 5.

$$f_h(t)=k^*(t)x_r(t) \quad \text{[Equation 4]}$$

$$f_d^*(t)=f_r(t)-k^*(t)x_r(t) \quad \text{[Equation 5]}$$

The controller 110 performs the control so that $f_d^*(t)$ is generated by the driver 120 according to Equation 5. Thereby, the user feels the force that subtracts the driving force $f_d^*(t)$ generated from the haptic device 200 from the repulsive force $f_r^*(t)$ generated by the collision between the colliding end 218 and the object, such that the user can feel the force augmented by the haptic device 200.

When the driver 120 drives the haptic device 200 with the driving force $f_d^*(t)$, it generates a force command $f_c^*(t)$ for driving the haptic device 200 and the haptic device 200 generates the driving force $f_d^*(t)$ according to the generated force command.

Herein, $f_c(t)$ may be identical with $f_d(t)$. In this case, the noise generated while the force sensor 217 provided in the colliding end 218 senses force directly influences the force command, such that the driver 120 cannot stably provide the driving force.

In order to solve this risk, a typical closed-loop stiffness method using proportional and differential control can be applied to $f_c(t)$. The closed-loop stiffness control may be represented by the following Equation 6.

$$f_c(t) = f_c(t-1) + K_p f_e(t) + K_d \frac{d f_e(t)}{dt} \quad \text{[Equation 6]}$$

where $f_e(t)=f_d^*(t)-f_d(t)$. This means a force error and $K_p$ and $K_d$ each mean a gain of proportional derivative. However, the problem of Equation 6 is that it is difficult to accurately measure $f_d(t)$. Of course, $f_d(t)$ can be obtained if the force sensor is further attached between the third link 216 and the second link 214 with reference to FIG. 2. However, this increases the complication of the system.

Therefore, the present invention proposes $f_d(t)=f_c(t-1)$. This is based on the assumption that the force command before one sampling time is equal to the force generated from the current haptic device 200 through a heuristic method. In other words, a driving force determined at a current point in time by the driver 120 may be a driving force according to the force command generated at a previous point in time by the driver 120. When the user stops the motion of his/her own hand in order to feel stiffness, this effect is assumed but these two forces are generally not consistently the same. If the user applies force to an object to move a tool in the object in order to feel stiffness or if the user feels stiffness and then removes force to move the tool out of the object, these two forces are slightly different from each other. However, since a person is limited in a speed range when moving objects, only a phase delay for the order of several milliseconds occurs. For example, when the user provides a sine wave having a period of 2.5 Hz and a stiffness of 2N as the force command, a value of $f_d(t)$ and $f_c(t-1)$ generates only a delay of 4 ms in the case of a phantom haptic device. The force error generated due to this delay is much smaller than force recognition just noticeable difference (JND) of a person.

As a result, the apparatus for providing haptic augmented reality according to at least one embodiment of the present invention allows the user integrated with the haptic device colliding with the object to bodily sense the stiffness different from the real stiffness of the object. For example, according to at least one embodiment of the present invention, even if the colliding end of the haptic device collides with a sponge, the user (moving one articulation of the haptic device to collide with a sponge) may have a feeling that the colliding end of the haptic device collides with a hard object like concrete, not a feeling that it collides with sponge.

Figure 3:
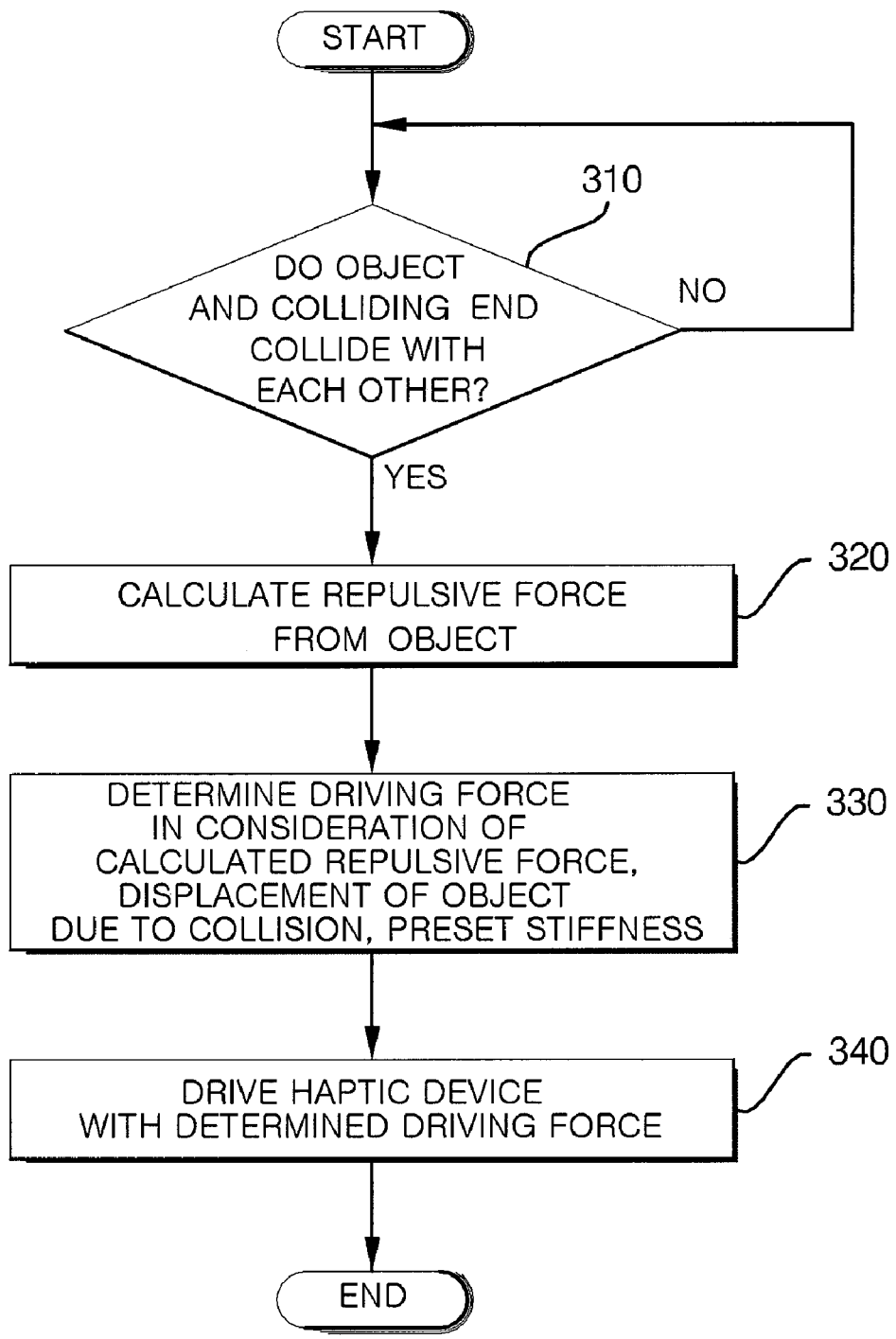
FIG. 3 is a flow chart of the method for providing haptic augmented reality according to at least one embodiment of the present invention.

FIG. 3 is a flow chart showing the method for providing haptic augmented reality according to at least one embodiment of the present invention. This will be described below with reference to FIG. 1.

First, the apparatus 100 for providing haptic augmented reality checks whether the object and the colliding end collide with each other (step 310).

At step 310, if it is checked that they collide with each other, the apparatus 100 for providing haptic augmented reality calculates the repulsive fore from the object (step 320).

After step 320, the apparatus 100 for providing haptic augmented reality determines the driving force in consideration of the repulsive force calculated in step 320, the displacement of the object due to collision, and the preset stiffness (step 330).

After step 330, the apparatus 100 for providing haptic augmented reality drives the haptic device by using the driving force determined at step 330 (step 340).

As described above, a program that enables a computer to run the method for providing haptic augmented reality according to at least one embodiment of the present invention can be stored in a recording medium readable with the computer. Herein, the recording medium readable with the computer includes a storage medium, such as a magnetic storage medium (for example, ROM, floppy disc, hard disc, etc.) and an optical reading medium (for example, CD-ROM, digital versatile disc (DVD)).

Figure 4:
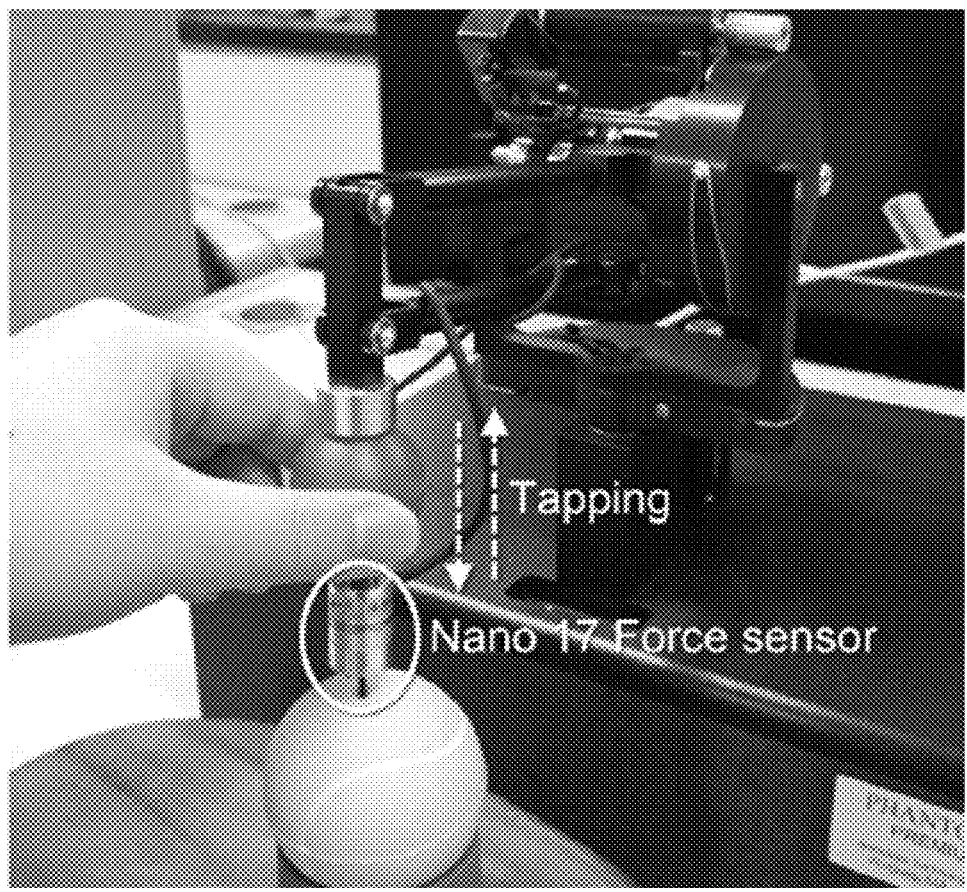
FIG. 4 is a diagram showing a real implementation example for applying the apparatus and method for providing haptic augmented reality according to the present invention.

Meanwhile, the inventors configured a system shown in FIG. 4 and performed an experiment by directly applying the present invention to four real objects, in order to verify the performance according to the present invention.

FIG. 4 is a diagram showing a real implementation example for applying the apparatus and method for providing haptic augmented reality according to the present invention.

Figure 5:
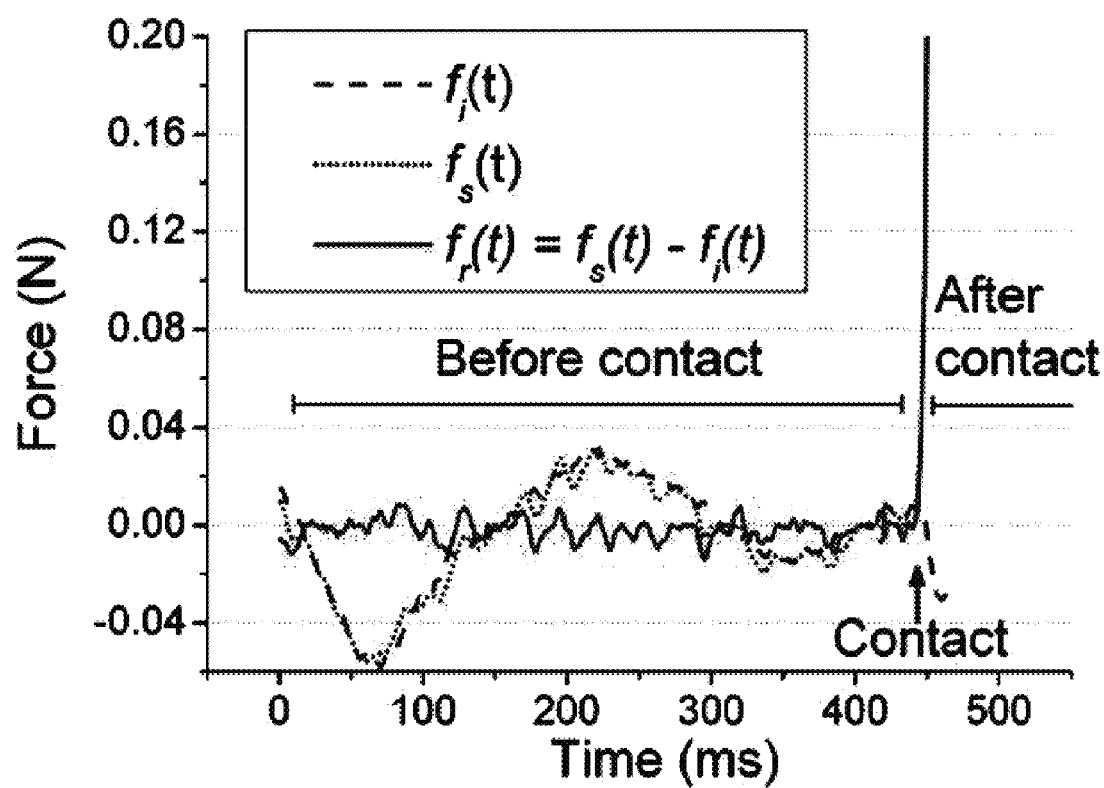
FIG. 5 is a diagram showing experimental results obtained by performing the collision check using the apparatus for providing haptic augmented reality according to FIG. 4.

In obtaining $f_r(t)$ according to the above Equations 1 and 2 using the apparatus for providing haptic augmented reality, the positional information provided by the haptic device is differentiated twice to obtain acceleration $a(t)$. FIG. 5 shows the results of calculating the force based on the above obtained acceleration. In order to measure the delay degree generated by using the low frequency pass filter, the difference does not exceed 0.015N when $f_r(t)$ is compared with $f_t(t)$ in the situation where there is no collision. This value does not exceed the noise level of the force sensor. Further, it can be confirmed from this value that the error degree due to the delay according to the use of the low frequency passing filter is not higher than the noise level due to the force sensor.

Figure 6:
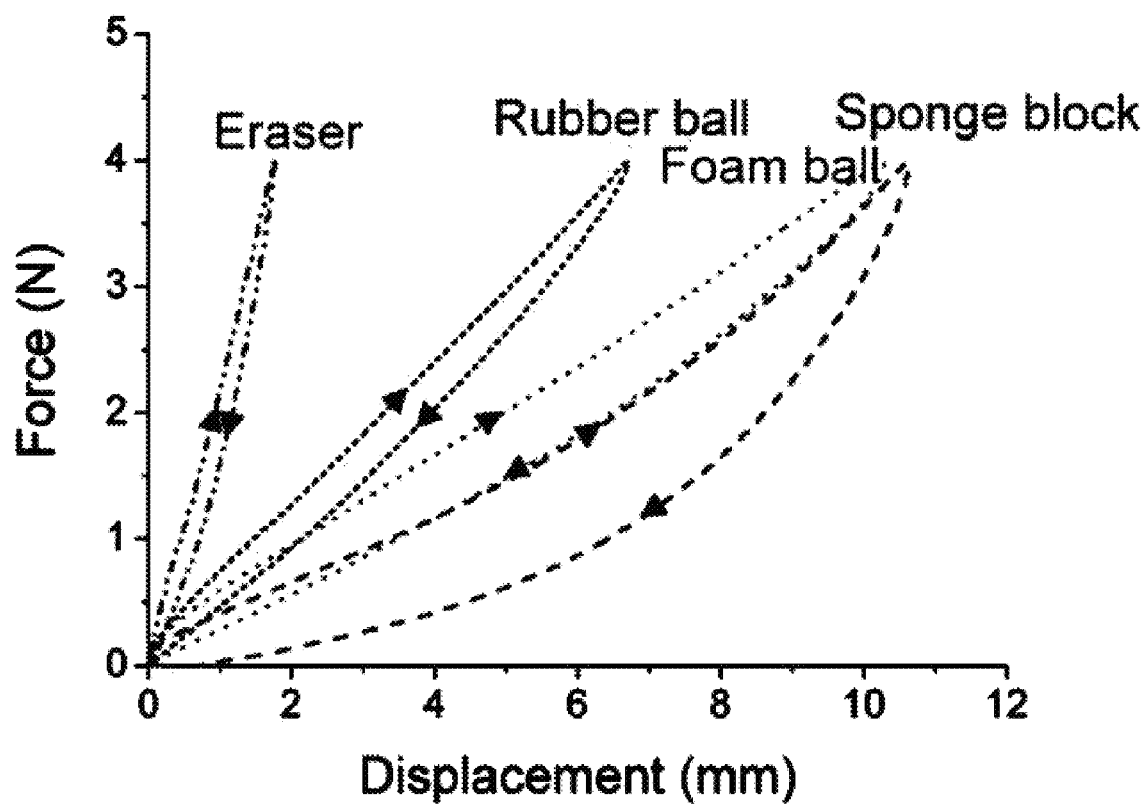
FIG. 6 is a diagram showing a relationship between forces of four objects used in the experiment and their positional displacement.

The four real objects tested by using the apparatus for providing haptic augmented reality according to FIG. 4 are a sponge block, a foam ball, a rubber ball, and a rubber eraser. The relationship between the force and the positional displacement of each real object is shown in FIG. 6. FIG. 6 shows the results of a well controlled tapping experiment by using the phantom haptic device and the force sensor. The force generated from the haptic device is changed from 0 N to 4 N at a speed of 0.5 N/s at the time of performing the tapping. As a result, it is shown that the rubber eraser has the most linear result and the sponge block has the most non-linear result and a large hysteresis.

Figure 7:
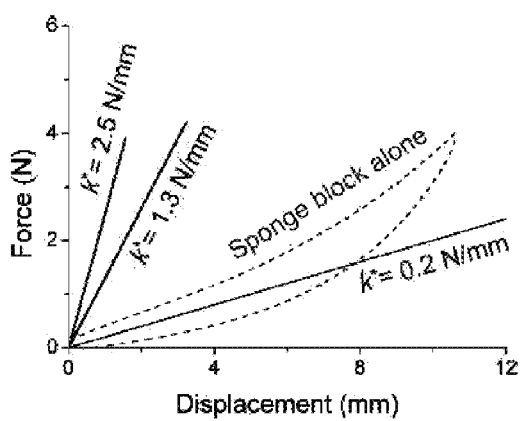
FIG. 7 is a diagram showing augmented stiffness from the experimental results.
Figure 7:
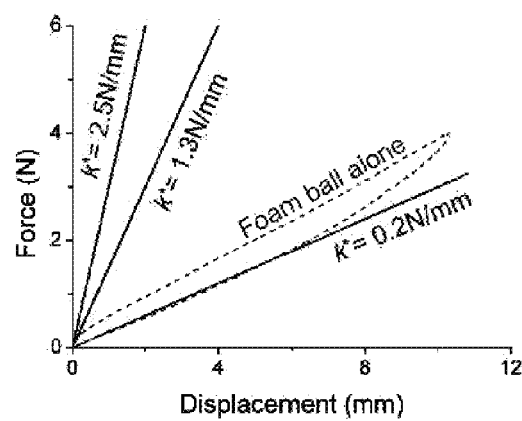
Figure 7:
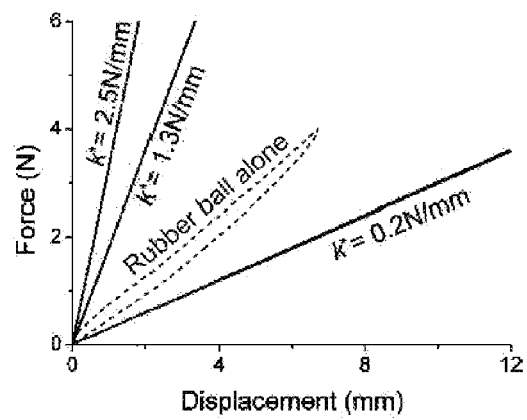
Figure 7:
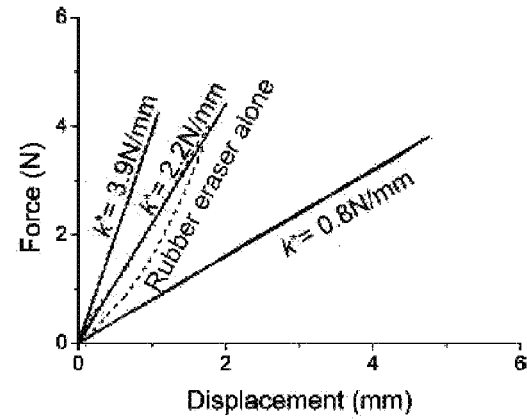

Thereafter, the tapping is then progressed and the positional displacement of the tool and the repulsive force received from the real object are measured. As described above, the force generated from the haptic device is replaced with the force command value transferred to the haptic device. The really operating stiffness is confirmed by calculating the force applied to the real user using these values and is compared with our desired stiffness. As shown in FIG. 7, the stiffness of the real objects is effectively deformed together. In FIG. 7, the sponge block is shown at the upper left, the foam ball is shown at the upper right, the rubber ball is shown at the lower left, and the rubber eraser is shown at the lower right.

Although the preferred embodiment of the present invention is described, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for providing haptic augmented reality comprising:
   a controller that calculates a repulsive force from an object and determines a driving force in consideration of the calculated repulsive force and preset stiffness; and
   a driver that drives a haptic device with the determined driving force,
   wherein the controller measures displacement of the object and determines the driving force in consideration of the measured displacement, the calculated repulsive force, and the preset stiffness.

2. The apparatus for providing haptic augmented reality according to claim 1, wherein the controller senses a collision between the object and the haptic device and generates control signals while the object is deformed due to the collision with the haptic device and the driver is operated in response to the control signals.

3. The apparatus for providing haptic augmented reality according to claim 2, wherein the controller checks whether the repulsive force from the object exceeds a threshold to sense a collision between the haptic device and the object.

4. The apparatus for providing haptic augmented reality according to claim 1, wherein the preset stiffness is preset stiffness corresponding to the object.

5. The apparatus for providing haptic augmented reality according to claim 1, wherein the preset stiffness is stiffness preset by a user independent of the object.

6. The apparatus for providing haptic augmented reality according to claim 1, wherein the driving force determined at a current point in time is a driving force according to a force command generated at a previous point in time by the driver.

7. The apparatus for providing haptic augmented reality according to claim 1, wherein the controller calculates the repulsive force from the object using force sensed by a sensor provided in a colliding end of the haptic device and inertia force of the colliding end.

8. The apparatus for providing haptic augmented reality according to claim 1, wherein the object is a real object.

9. A method for providing haptic augmented reality comprising:
   calculating a repulsive force from an object;
   measuring displacement of the object;
   determining a driving force in consideration of the calculated repulsive force and preset stiffness; and
   driving a haptic device with the determined driving force,
   wherein the determining determines the driving force in consideration of the calculated repulsive force, the measured displacement, and the preset stiffness.

10. The method for providing haptic augmented reality according to claim 9, further comprising sensing a collision between the object and the haptic device,
    wherein the calculating, the determining, and the driving are performed while the collision between the object and the haptic device is sensed.

11. The method for providing haptic augmented reality according to claim 10, wherein the sensing checks whether the repulsive force from the object exceeds a threshold to sense the collision between the haptic device and the object.

12. The method for providing haptic augmented reality according to claim 9, wherein the preset stiffness is preset stiffness corresponding to the object.

13. The method for providing haptic augmented reality according to claim 9, wherein the preset stiffness is stiffness preset by a user independent of the object.

14. The method for providing haptic augmented reality according to claim 9, wherein the driving force determined at a current point in time is a driving force according to a force command generated at a previous time in point by the driving step.

15. The method for providing haptic augmented reality according to claim 9, wherein the calculating calculates the repulsive force from the object using force sensed by a sensor provided in a colliding end of the haptic device and inertia force of the colliding end.

16. The method for providing haptic augmented reality according to claim 9, wherein the object is a real object.

* * * * *